Dec. 26, 1939.  H. H. SNYDER  2,184,900
GLASS WORKING MACHINE
Filed Dec. 28, 1936  6 Sheets-Sheet 1

INVENTOR.
HAROLD H. SNYDER
BY Dorsey & Cole
ATTORNEYS.

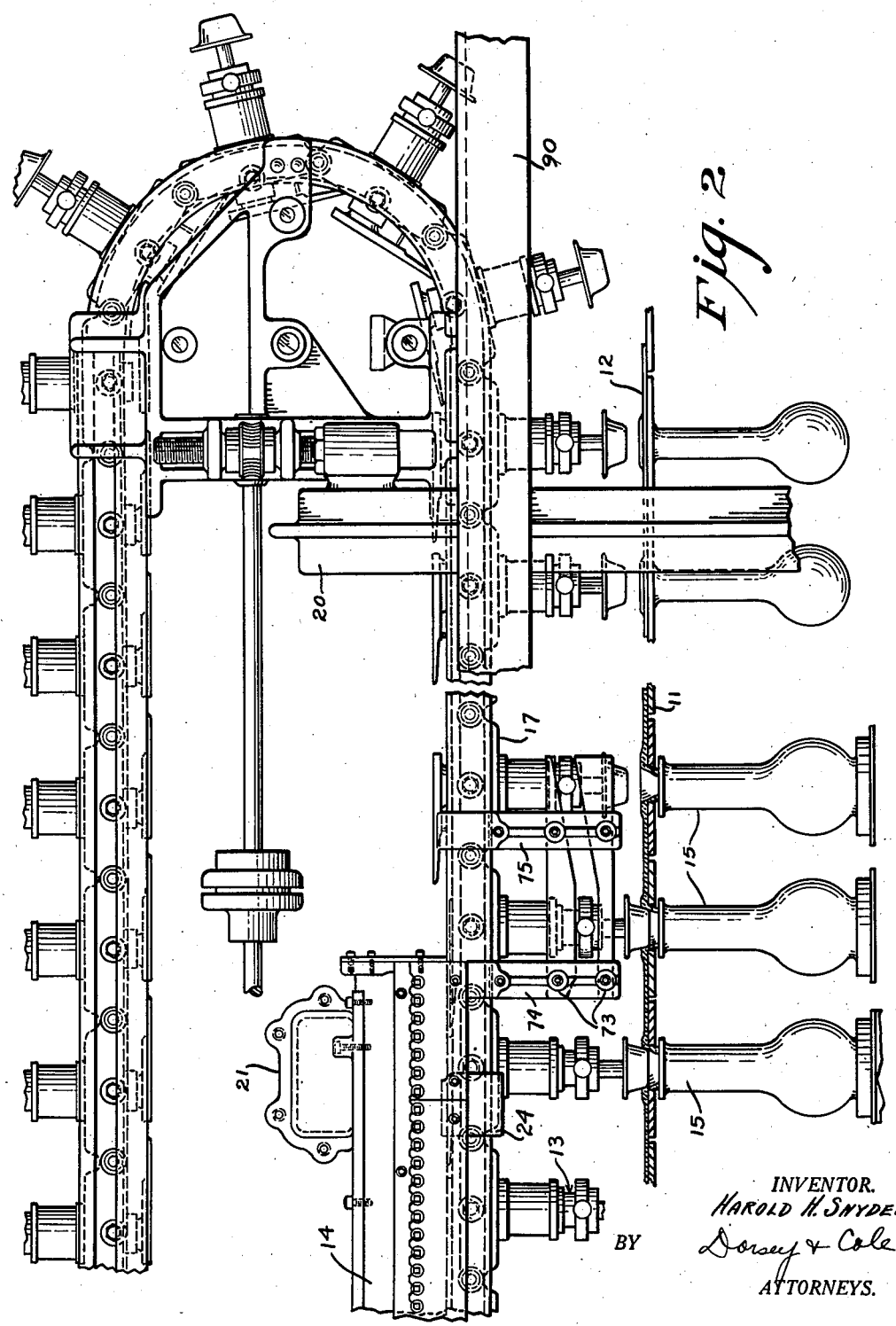

Dec. 26, 1939.   H. H. SNYDER   2,184,900
GLASS WORKING MACHINE
Filed Dec. 28, 1936   6 Sheets-Sheet 3
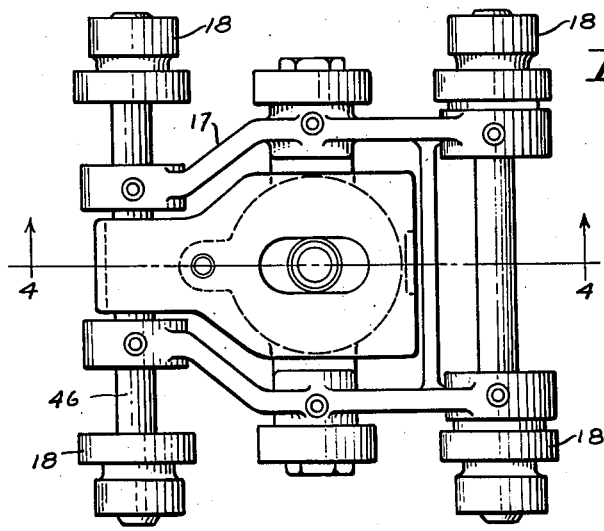
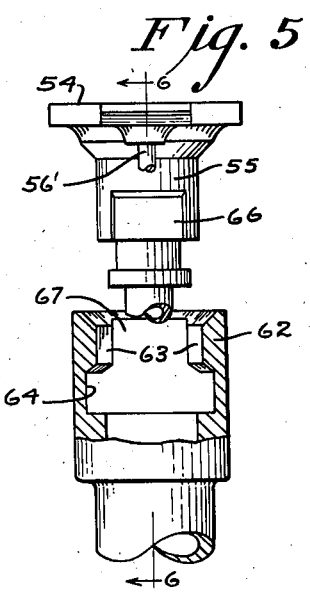
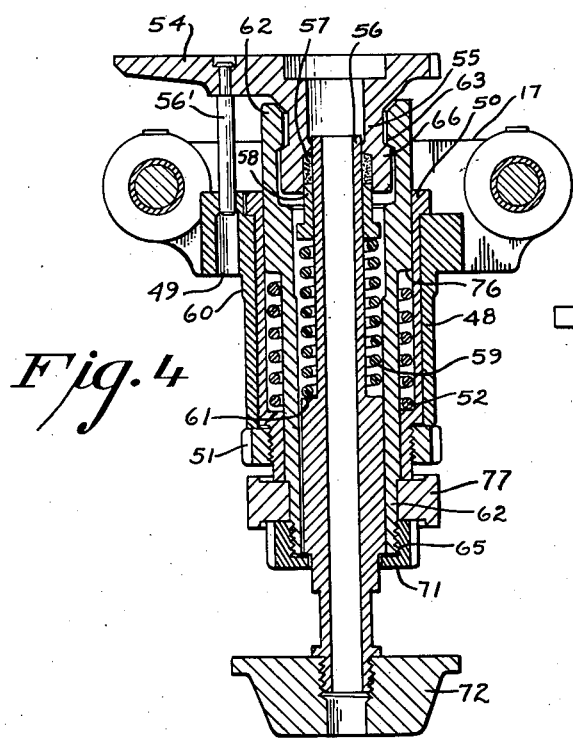
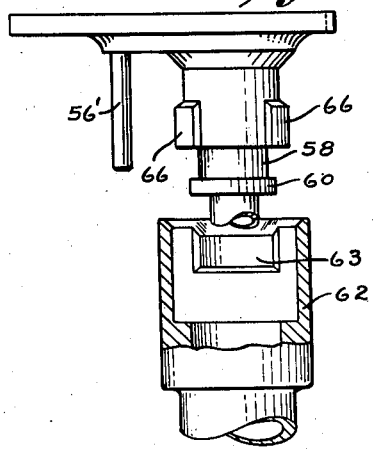
INVENTOR.
HAROLD H. SNYDER
BY Dorsey & Cole
ATTORNEYS.

Dec. 26, 1939. H. H. SNYDER 2,184,900
GLASS WORKING MACHINE
Filed Dec. 28, 1936 6 Sheets-Sheet 4
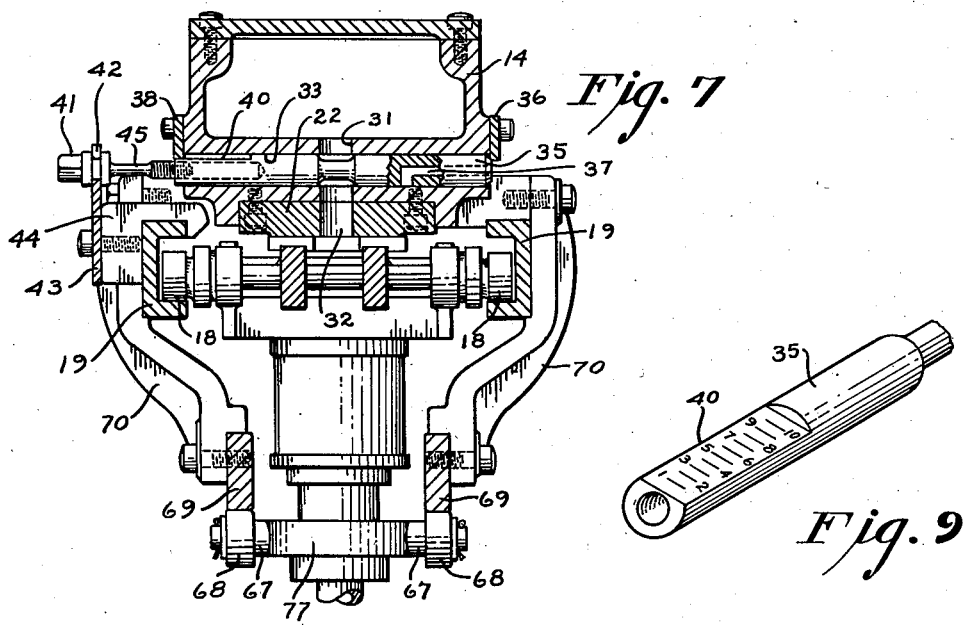
Fig. 7
Fig. 9
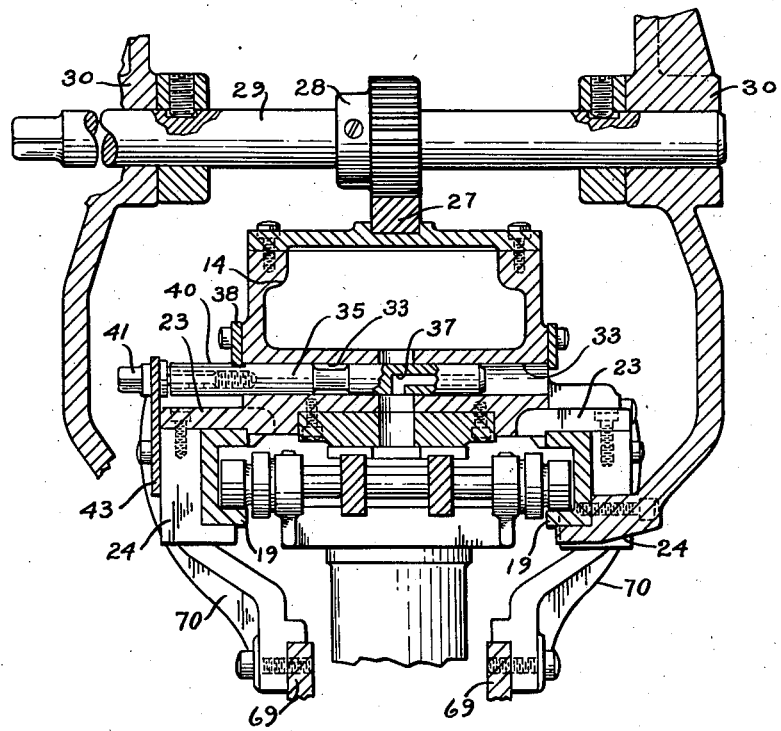
Fig. 8
INVENTOR.
HAROLD H. SNYDER
BY Dorsey + Cole
ATTORNEYS.

Dec. 26, 1939.   H. H. SNYDER   2,184,900
GLASS WORKING MACHINE
Filed Dec. 28, 1936   6 Sheets—Sheet 6
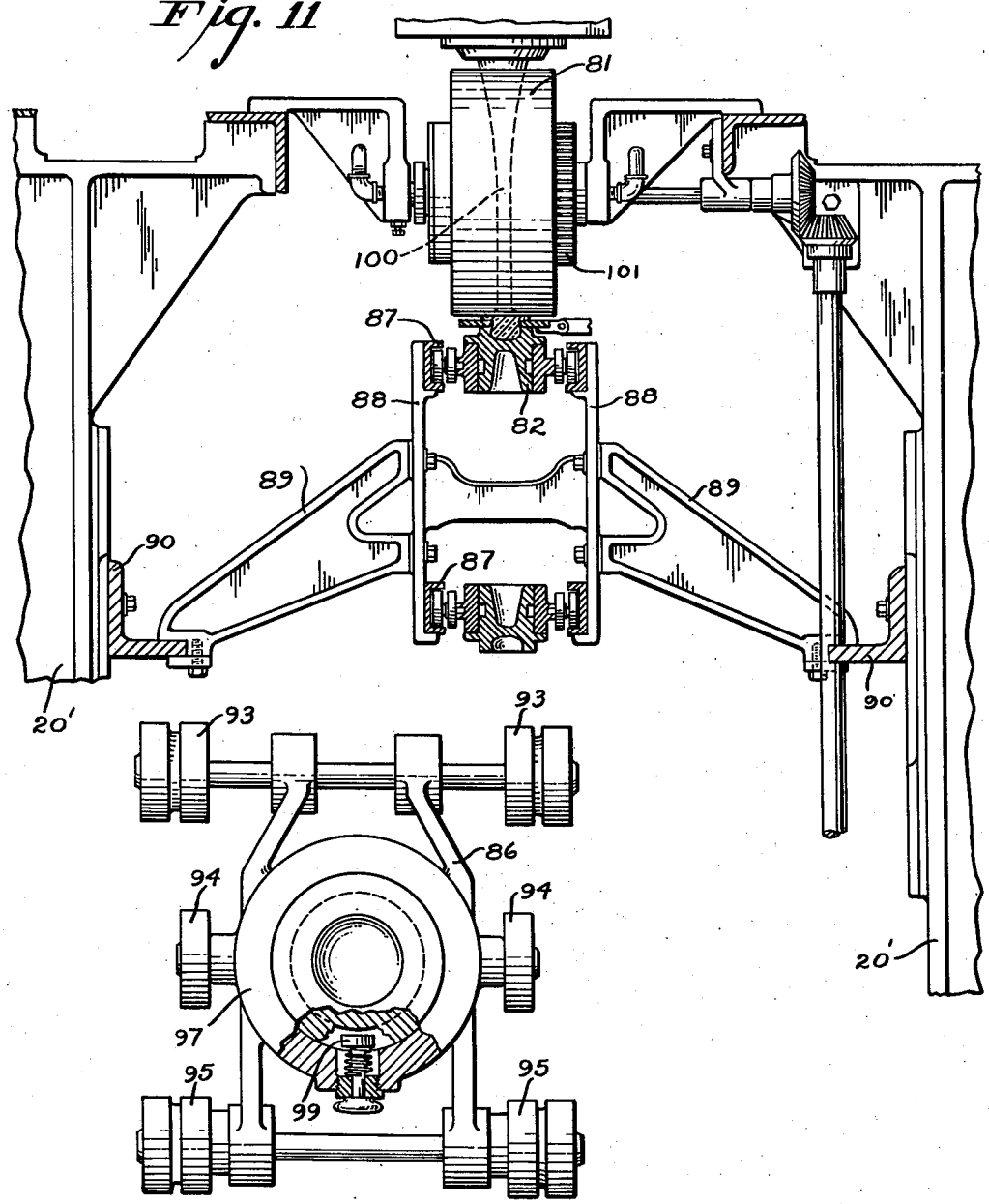
INVENTOR.
HAROLD H. SNYDER
BY Dorsey & Cole
ATTORNEYS.

Patented Dec. 26, 1939

2,184,900

UNITED STATES PATENT OFFICE 2,184,900

GLASS WORKING MACHINE

Harold H. Snyder, Corning, N. Y., assignor to Corning Glass Works, Corning, N. Y., a corporation of New York Application December 28, 1936, Serial No. 117,951

4 Claims. (Cl. 49—19)

The present invention relates to glass working machines and particularly to improvements in the general type of machine disclosed in the Woods et al. patent, No. 1,790,397, granted January 17, 1931, and designed primarily for the quantity production of electric light bulbs. While a glass blowing machine such as disclosed in the patent has quite satisfactorily met the requirements of the past, there has since been an insistent demand for a machine which will produce such bulbs at a higher rate of speed. There has also been a desire to be able to produce bulbs of a size not in the past satisfactorily manufactured by such a machine, and a desire to further reduce the per unit cost of the bulbs produced.

One object of this invention is the production of ware of a uniformly high quality.

Another object is the broadening of the type of ware which can be successfully produced.

A still further object is the production of ware in such a manner that the percentage of cullet with respect to ware produced is reduced to a minimum.

Among its features this invention embodies a blow-box assembly equipped with slide valves for the control of the air supply to the blow-head mechanisms.

Another feature is a blow-head mechanism having a shoe comprising a unitary member having a depending portion which telescopes over the upper end of the blow-head spindle and is provided with a suitable self-adjusting packing gland so that a substantially permanently leakproof air passage is provided between the shoe and blow-head spindle.

Another feature has to do with the provision of facilities for the convenient disassembly of the blow-head for replacement or repair.

A still further feature is an arrangement including a glass distributing roll and a chain of parison molds cooperative with the orifice plates and a stream of molten glass to produce a ribbon of plastic glass having buttons on the under side thereof in perfect register with the orifices in the orifice plates.

Since the present invention has to do principally with the blow-box and blow-head assemblies and with apparatus employed to form the ribbon of glass from which bulbs are fabricated, the present disclosure has, accordingly, been restricted to that considered sufficient for a full understanding of the invention in the light of the cited patent.

In the accompanying drawings:

Figs. 1 and 2 together constitute a side elevational view of portions of a glass blowing machine embodying this invention;

Fig. 3 is a plan view of a blow-head mechanism and its carriage;

Fig. 4 is a sectional elevation taken on line 4—4 of Fig. 3;

Figs. 5 and 6 are fragmentary sectional views in elevation of parts of the blow-head;

Fig. 7 is a sectional elevation taken on lines 7—7 of Fig. 1;

Fig. 8 is a sectional elevation taken on lines 8—8 of Fig. 1;

Fig. 9 is an enlarged fragmentary view, in perspective, of a slide valve;

Fig. 11 is a sectional elevation taken on line 11—11 of Fig. 10; and

Fig. 12 is an enlarged plan view of one unit of the chain assembly shown in Fig. 10.

Figure 1:
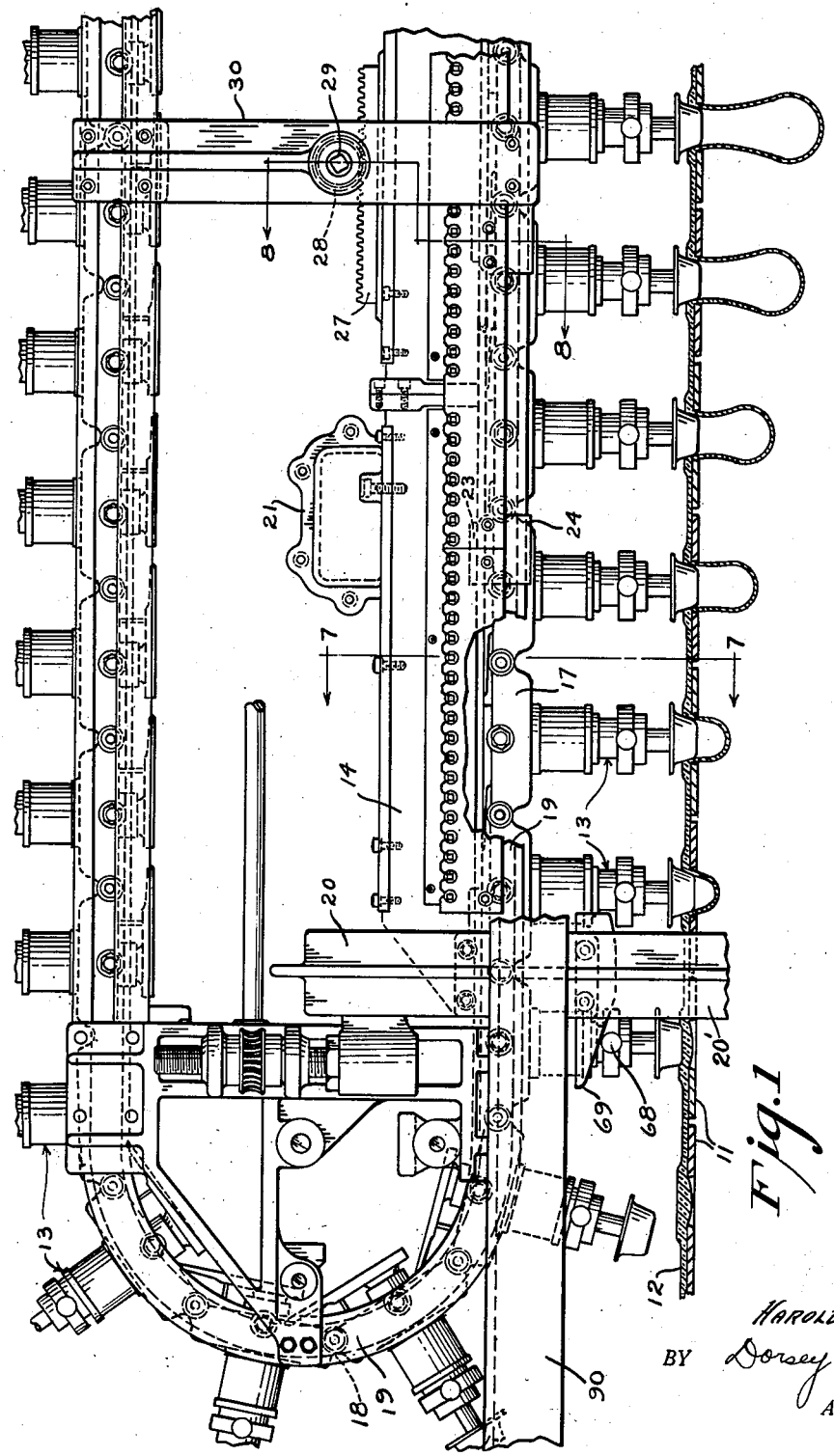

The glass working machine illustrated is basically the same as that disclosed in the cited prior Woods et al. patent and includes a chain of orifice plates 11 (Figs. 1 and 2) supplied with a ribbon of glass 12 from which ware is fabricated by the cooperative action of blow-heads 13 supplied with air by a blow-box 14 and a chain carrying ware molds 15.

The links 17 of a chain carrying blow-heads 13 are provided with suitable supporting rollers 18 which ride in a channeled track comprising rails 19 adjustably supported on appropriately spaced yokes 20 bridging suitable standards 20'. Neither the supporting means for the chain of orifice plates 11 or the chain carrying the molds 15 have been shown, it being understood that these may take the form of the similar parts disclosed in the cited Woods et al. patent.

The blow-box 14 is provided with the usual air supply fittings 21, has on the underside therein a blow-box bottom plate 22 (Figs. 7 and 8), and is provided with a number of laterally extended supporting members 23 resting on the lower run of the track rails 19. The blow-box 14 is prevented from rising from the track rails 19 by L shaped clamp thrust plates 24 secured to the under side of the edges of the extended supporting members 23 of the blow-box. Mounted on the central top section of the blow-box (Fig. 8) is a rack 27 cooperative with a pinion 28 rotatable by a keyed shaft 29 journaled in brackets 30 secured to the opposite rails 19 of the track. By rotation of shaft 29 the blow-box 14 may be moved endwise, for a purpose which will be explained later.

Throughout the length of the blow-box the bottom thereof is provided with closely spaced air supply apertures 31 (Figs. 7 and 8) in alignment with similar apertures 32 in its bottom plate 22. Each of these apertures is intersected by a similarly spaced bore 33 passing laterally through the blow-box and containing a slide valve 35. This valve consists of a round rod with the diameter of its central portion reduced so that when it is in the position illustrated in Fig. 7 it permits the free passage of air from the blow-box 14 through apertures 31 and 32. Further movement of valve 35 to the right is prevented by a valve stop plate 36 fixed to the right hand side of the blow-box. The valve 35 may, however, be moved to the left and when so moved a distance of slightly over the diameter of the apertures 31 and 32 cuts off communication between these apertures; and when moved still farther to the left connects the aperture 32 with atmosphere via a passage 37 in the right hand end of the valve, as illustrated in Fig. 8. The further movements of valve 35 to the left, as well as its rotation, is prevented by a stop plate 38 secured to the left hand side of the blow-box and engaging a flattened portion 40 of the valve. The movement of the valve is brought about by a keyed valve screw 41 threaded into the valve 35 and supported near its keyed end in a notch 42 of a valve thrust plate 43 secured to the clamp thrust plates 24 and other support thrust plates 44 arranged at spaced intervals along the adjacent track rail 19. As illustrated in Fig. 9, the non-threaded intermediate flat portion 40 of valve screw 41 has graduations marked thereon so that by noting the position of the graduations with respect to plate 38 the exact position of the valve may be determined at a glance.

The blow-head supporting links 17 differ from those of the patent in that the webbed or central portions thereof are of a shape suitable to accommodate newly designed blow-head assemblies 13. The central portion of each of the links 17 includes a depending cylindrical shell 48 (Fig. 4) and a shoe guide pin aperture 49. A ring bushing 50 is introduced into the bore of the shell 48 and is held fixed thereto by a bushing ring lock nut 51 threaded on the lower end of the ring bushing 50 against shell 48. A sleeve spring 52 is introduced into the bore of the ring bushing 50 and completes the preparation for the introduction of the blow-head assembly proper therein.

The blow-head assembly includes an articulated shoe 54 having a depending sleeve supporting portion 55 and a shoe guide pin 56' which enters aperture 49 and serves to hold the shoe 54 in proper alignment with the link 17. The intermediate portion of the bore of the depending portion 55 of the shoe is of a diameter suitable to snugly receive the upper end of a blow-head spindle 56, while the lower portion of the bore is enlarged to accommodate a suitable packing ring 57 and of a depth suitable for also accommodating a packing gland 58. A spindle spring 59 is threaded onto the spindle 56 between the flange of the packing gland 58 and the shoulder 61 of the spindle and serves to compress the packing ring 57 as necessary to maintain an airtight fit between the bore of the depending portion 55 and that of the spindle 56 as wear takes place and until the packing ring 57 is substantially all worn away. A spindle enclosing sleeve 62 slides upwardly over the spindle 56 and is provided at its upper end with an enlarged bore 64 (Fig. 5) for receiving oppositely disposed supporting lugs 66 on the external wall of the shoe depending portion 55. The lugs 66 enter channels 67 in the enclosing sleeve 62 and are cooperative with lugs 63 within the latter sleeve to loosely support the sleeve thereon when rotated ninety degrees with respect to each other.

In assembling the unit the spindle spring 59, packing gland 58 and packing ring 57 are threaded on the upper portion of the spindle 56 in the order named and the whole introduced upward into the bore of the depending portion 55 of the shoe, the packing ring 57 and gland 58 entering the enlarged bore of shoe portion 55.

After rotating the shoe and sleeve 62 into locking relation, the unit may be lowered into position in link 17, the guide pin 56' entering guide aperture 49 and sleeve 62 entering bushing 50 until shoulder 76 comes to rest on spring 52.

A cam roller supporting ring 77 is now placed on the lower end of the spindle sleeve 62, and is held against a shoulder thereof and the bottom end of the ring bushing 50 by a sleeve nut 65 threaded on the bottom end of sleeve 62 and having an inwardly extending flange 71 cooperative with a shoulder on the spindle 56 to hold the spindle in the sleeve and the spring 59 compressed the required extent to insure air tight seal being produced by packing 57. As illustrated in Fig. 4, in the compression of spring 59 the shoe 54 is also moved upward with respect to the spindle 56 until the up and down play between the top surfaces of lugs 66 and the bottom surfaces of lugs 63 is taken up, so that it will be seen a limited amount of endwise movement between the shoe 54 and spindle 56 can occur under tension of the spindle spring 59.

As will also be apparent from an inspection of Fig. 4, assembly of the spindle 56 and the parts 61, 60 and 57 threaded on it, may be delayed if desired until the other described parts have been placed in the link 17 and accordingly can be readily removed therefrom to replace packing 57, or for any other reason without removing any of the other parts from the link. The bottom of the blow-head spindle has threaded thereon the usual blow-head tip 72.

The cam roller supporting ring 77 is provided with tubular lugs 67 (Fig. 7), extending from two opposite sides thereof and have introduced therein spindles carrying a pair of cam rollers 68. In operation of the machine, as the blow-heads 13 approach the blow-box 14, these rollers encounter cams 69 supported from brackets 70 arranged on opposite sides of the blow-box and force the blow-heads 13 downward against the tension of their springs 52 into engagement with the glass ribbon 12 and bring the top surface of their shoes 54 to a level very slightly below the bottom of the blow-box plate 22 until the rollers 68 move beyond the ends of the cams, thereby preventing the excessive wear between the blow-box bottom plate 22 and shoe 54 which occurs when the downward movement of the blow-head is brought about by the riding of the end of the blow-box plate 22 over the shoe, as is the case with one form of the constructions shown in the cited patent. As the blow-head shoes pass under the blow-box the usual puffs of air are supplied therefrom, pass through the valves 35 hereinbefore described, and through the shoe and sleeve supporting ring integral therewith to the bore of the spindle by the dependable air passage afforded by packing ring 57 and its cooperating gland and spring.

Just before the blow-heads pass from under the blow-box, rollers 68 engage a second pair of cams 73 supported from pairs of brackets 74 and 75 arranged on opposite sides of the blow-box, and which cams hold the blow-heads in their down position until their shoes clear the blow-box plate 22, thereby again preventing excessive wear between it and the shoes. As the rollers 68 pass off cams 73 the blow-heads are again raised by their springs 52.

By use of slide valves operated by screws having graduations marked thereon to indicate their position, a very accurate setting of such valves may be attained. The more important advantage of such valves, however, is that they overcome a fault sometimes present in poppet type valves, wherein warping of the seat occasionally interferes with their proper setting.

As a result of the improved design of blow-head the volume of air supplied to the spindle thereof is very uniform over long operating periods and can be supplied in quantities enabling the successful manufacture of bulbs of a size not satisfactorily manufactured by similar machines of the past. In certain past constructions flexible air passages have been provided between the blow-box and blow-head spindles, but have proved objectionable not only because of frequent development of air leaks, but also because of their inability to withstand the higher blow-head temperatures most suitable for the production of bulbs free from checks, as is possible with the present form of construction.

The facilities provided enabling endwise movement of the blow-box has proven a convenient way of varying the position of the blow-box and its blow-head actuating cams with respect to the moving chain of blow-heads, as required to insure their being lowered exactly concentrically with respect to the apertures in the orifice plates 11, as is necessary to the successful production of perfect ware.

Figure 10:
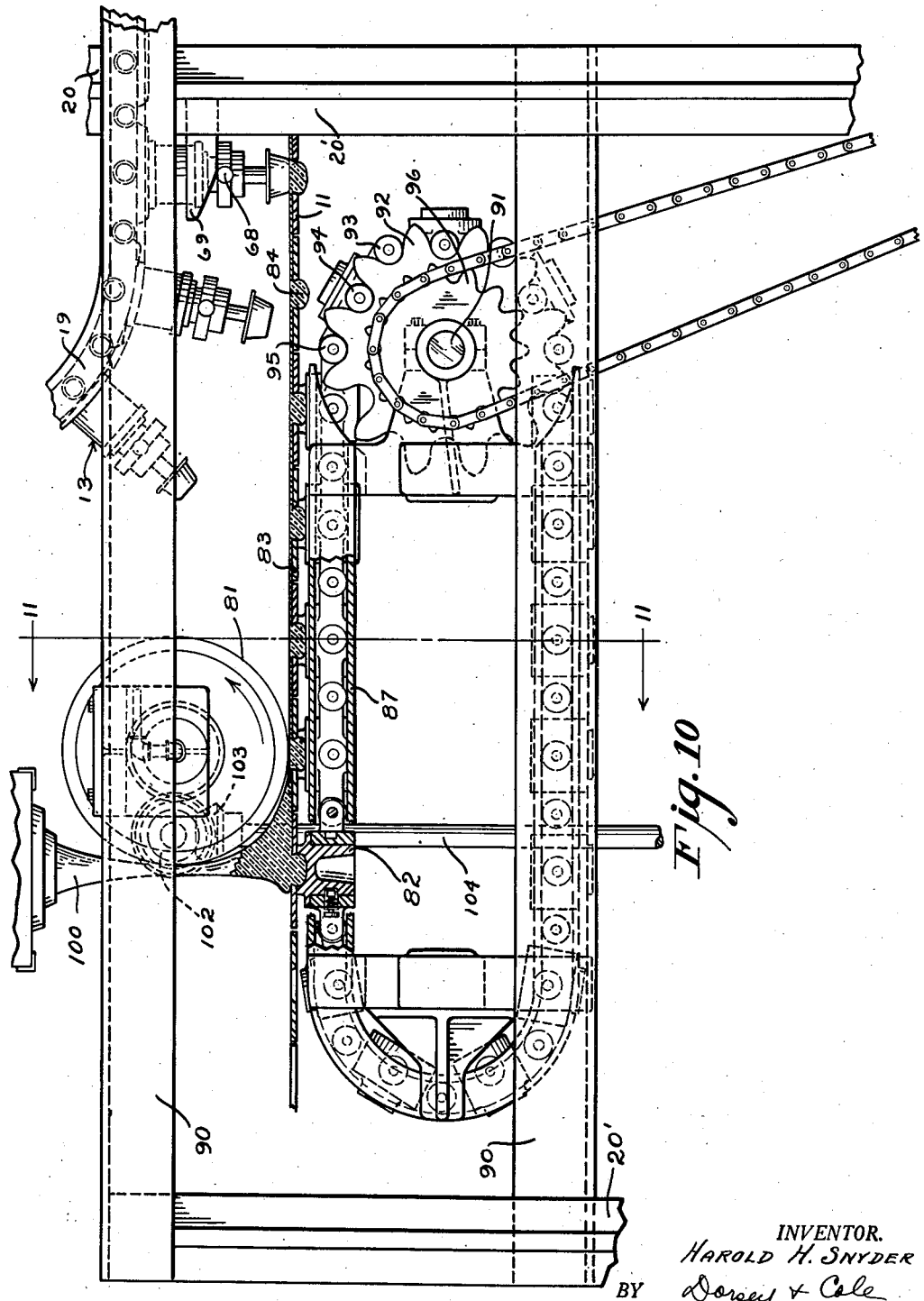
Fig. 10 is a side elevational view of the ribbon forming end of a glass blowing machine embodying the invention.

In the preceding detailed description, it has been assumed that a conventional ribbon forming apparatus such as disclosed in the Woods et al. patent is employed. In such a machine, due to the rise in temperature of the orifice plates, a certain amount of variation of the distance between centers of the orifices occur, while the spacing between the pockets in the pocket roll remains substantially constant. Variation of the distance between centers of the buttons, however, may occur as a result of stretch of the ribbon which is sometimes caused by momentary sticking of the buttons in the pockets of the roll or as a result of a temporary drop in the viscosity of the glass. Because of these variable factors the buttons formed seldom line up concentrically with the orifice plate orifices. Therefore, the buttons are made of greater diameter than otherwise necessary so as to reasonably assure there being a proper quantity of glass over the orifices under these varying conditions to produce satisfactory bulbs, although siding may even then sometimes occur and cause defective ware to be produced when maximum variations occur. These faults are avoided by a modification of ribbon forming arrangement, such as illustrated in Figs. 10, 11, and 12. This apparatus is included in that position of the machine which extends to the left of that illustrated in Fig. 1 and includes a plain roll 81 and a chain carrying parison molds 82 cooperative with the chain of orifice plates 11 to directly form a ribbon of glass 83 thereon having buttons 84 on the under side thereof. The chain carrying molds 82 is made up of a plurality of links 86 which are somewhat similar to links 17 of the blow-head chain, and is supported by a channeled track 87 in turn mounted in track carrier plates 88 suitably supported by pairs of brackets 89 extending between such plates and a pair of angle iron rails 90 attached to the standards 20'. The chain of molds 82 is adapted to be driven at identically the same speed as are the orifice links 11 by toothed wheels 91 between the teeth 92 of which the rollers 93, 94, and 95 of the respective links 86 ride. The position of the molds 82 as they engage the orifice plates is such that their open tops are in perfect register with the orifices of the orifice plates. Power is transmitted to the wheels 91 from the main drive shaft of the machine (not shown) by a chain driven sprocket wheel 96.

The molds 82 are cylindrical in shape and have an outwardly extending flange 97 on which they rest in their associated links 86 and are securely held in place by spring actuated latches 99 carried by the links and entering a groove passing transversely around the outer walls of the molds.

The roll 81 is arranged in substantially the same relation to a stream of glass 100 as is the pocket roll 80 in the machine illustrated in the cited patent, but is arranged to directly cooperate with the orifice plates 11 to form the ribbon 83. The roll 81 is driven by a chain of gears 101, 102, 103, and a drive shaft 104 receiving power from the main drive of the machine (not shown), and has a surface speed in the neighborhood of that of the orifice plates.

In operation the stream of glass 100 is intercepted by the roll 81 which cooperates with the moving orifice plates to squeeze the glass into the pockets formed by the positioning of the parison molds 82 in register with the orifices of the orifice plates. These molds are successively moved clear of the orifice plates shortly before the tip 72 of the approaching blow-head assembly 13 engages the ribbon of glass.

Among the advantages of the foregoing ribbon forming arrangements are, (1) the amount of glass contained in the buttons 84 is restricted to that required to form the ware, thereby effecting an appreciable reduction in cullet, which is reflected in reduced cost per unit of ware made; and (2) perfect alignment of the buttons with the orifice plate orifices so that perfect ware can be produced under conditions in which siding would result with the former arrangement.

While in the foregoing there have been shown and described preferred embodiments of the invention, it is to be understood that minor changes in the details of construction, combination and arrangement of parts may be resorted to without departing from the spirit and scope of my invention.

I claim:

1. In a glass working machine wherein air pressure is applied to the product being manufactured through the shoe and spindle of an associated blowhead assembly, a shoe having a depending portion with an air passage therethrough, a removable sleeve surrounding such depending portion and suspended therefrom, a hollow blowhead spindle extending substantially through said sleeve and into the air passage of the depending portion of said shoe, and means providing an air seal between the interior walls of the depending portion of said shoe and the exterior walls of that portion of said spindle entering the passage of the depending portion.

2. In a glass working machine wherein air pressure is applied to the product being manufactured through the shoe and spindle of an associated blowhead assembly, a blowhead shoe having a depending portion with an air passage therethrough, a removable sleeve suspended from such depending portion, a hollow blowhead spindle surrounded by said sleeve, and means arranged around said spindle between it and said sleeve cooperative with said spindle and with the depending portion of said shoe to maintain a substantially air-tight connection between said spindle and the depending portion of said shoe.

3. In a blowhead assembly, a shoe having a depending portion with a passage therethrough having a restriction therein, a sleeve surrounding and suspended from said depending portion, a blowhead spindle in said sleeve extended through the passage in said depending portion, a packing ring surrounding said spindle at a point adjacent the restriction in the passage, and a packing gland and spring cooperative with said ring and spindle to produce and maintain an air tight seal between the exterior wall of the spindle and the depending portion of said shoe throughout the life of said ring.

4. In a blowhead mechanism and support therefor, a main supporting unit having a bore passing therethrough, a shell lining such bore and having a shoulder on its inner surface, means for holding said shell fixed with respect to said unit, an apertured blowhead shoe arranged above said shell, a sleeve member suspended from said shoe having a shoulder on its exterior surface, a resilient member compressed between the shoulders of said shell and sleeve, a blowhead spindle in said sleeve member having an external shoulder and extending into the aperture of said shoe, a packing ring surrounding said spindle near the upper end thereof, a packing gland adjacent said ring, and a spring surrounding an intermediate portion of said spindle held partly compressed between the shoulder thereof and said packing gland.

HAROLD H. SNYDER.